Figure 1:
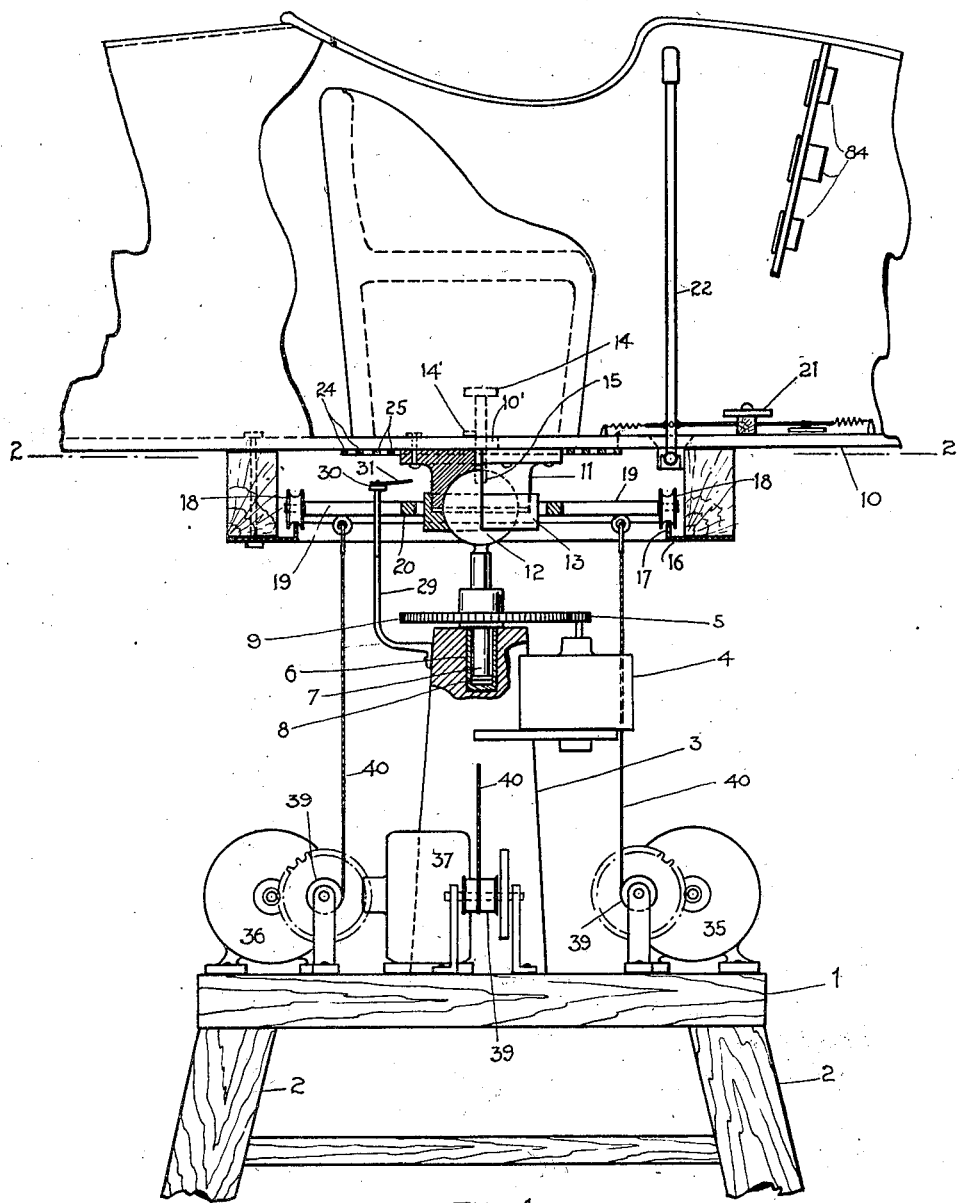

July 5, 1932.  J. P. BUCKLEY  1,865,828
AERONAUTICAL INSTRUCTING DEVICE
Filed July 3, 1929  6 Sheets-Sheet 1

Inventor
John P. Buckley
By Ross J. Woodward
Attorney

July 5, 1932.  J. P. BUCKLEY  1,865,828

AERONAUTICAL INSTRUCTING DEVICE

Filed July 3, 1929  6 Sheets-Sheet 2

Inventor
John P. Buckley
By Ross J. Woodward
Attorney

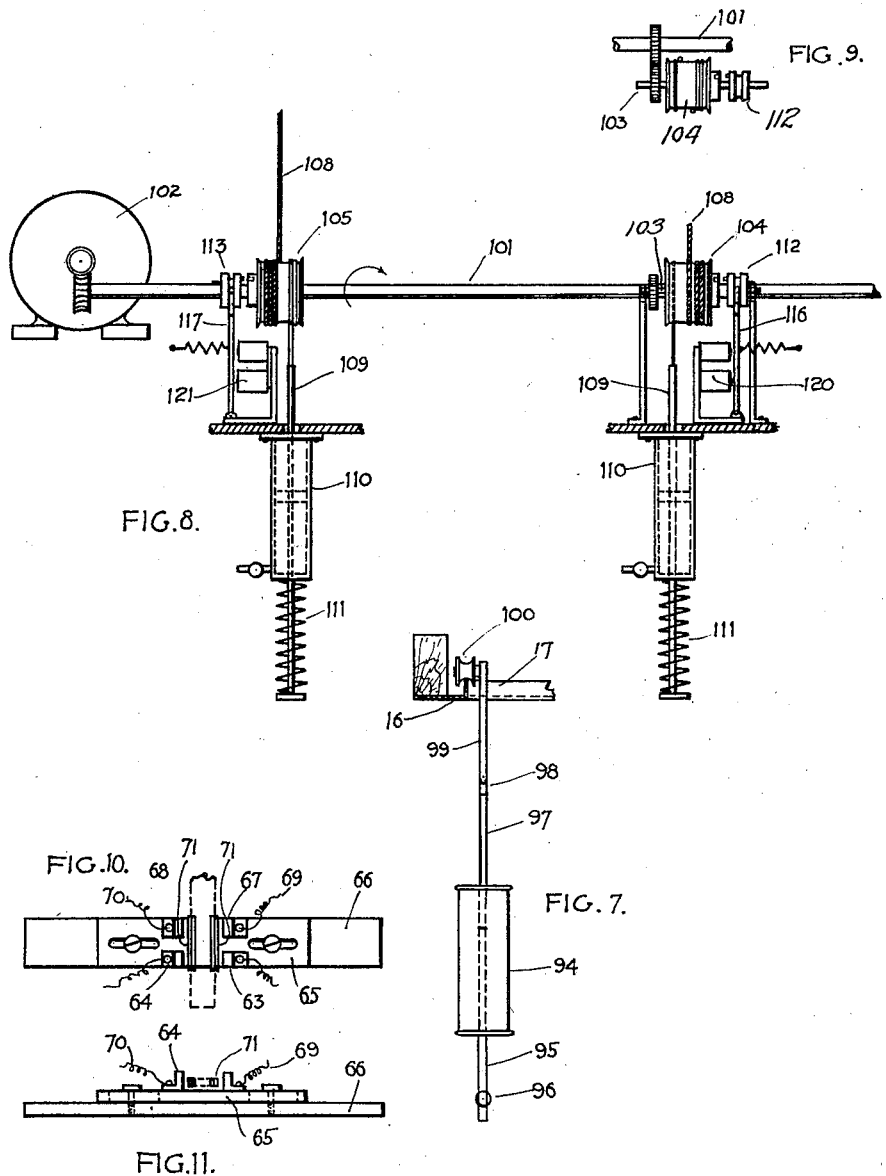

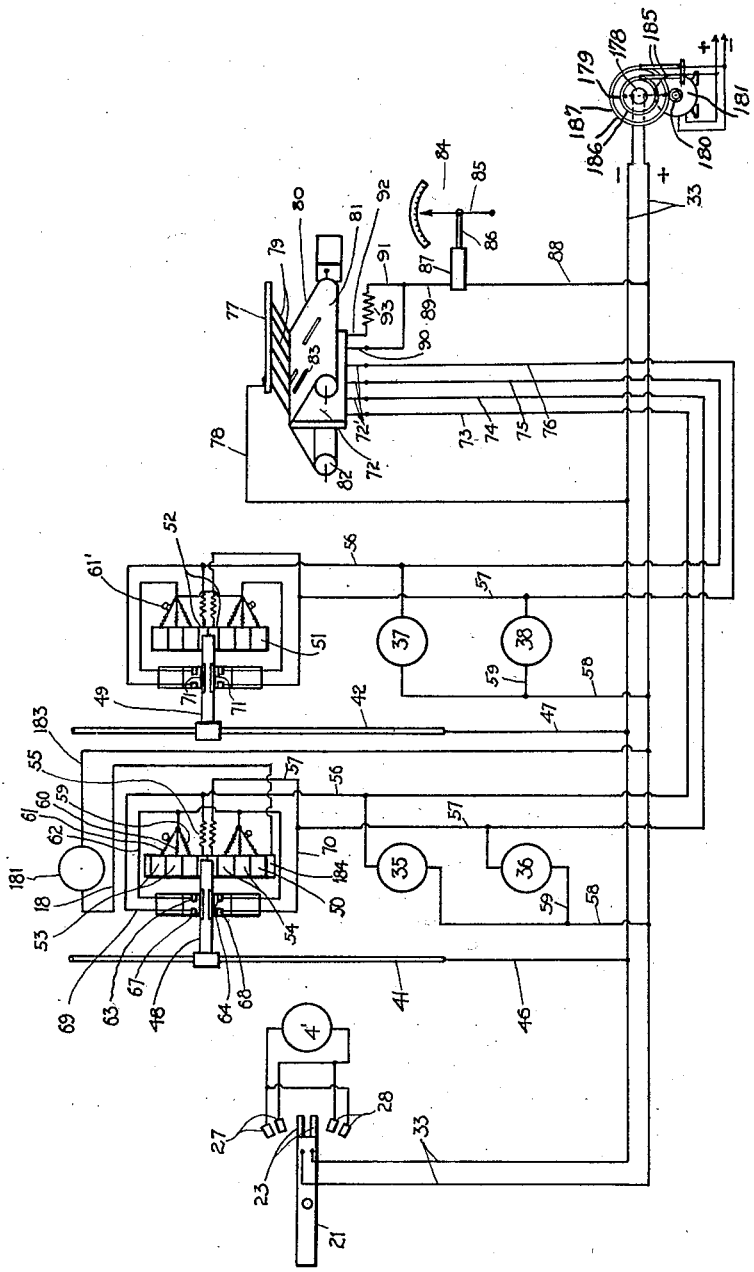

July 5, 1932.  J. P. BUCKLEY  1,865,828
AERONAUTICAL INSTRUCTING DEVICE
Filed July 3, 1929  6 Sheets-Sheet 5

Inventor
John P. Buckley
Ross J. Woodward
Attorney

Patented July 5, 1932

1,865,828

UNITED STATES PATENT OFFICE

JOHN P. BUCKLEY, OF WASHINGTON, DISTRICT OF COLUMBIA

AERONAUTICAL INSTRUCTING DEVICE

Application filed July 3, 1929. Serial No. 375,741.

This invention relates to aeronautics and more particularly to a device by means of which student aviators may be taught the rudiments of flying before actually making a flight.

Several ground devices, more or less efficient, have been perfected for teaching students the rudiments of flying and while these devices serve the purpose to some extent they do not go far enough in the attempt to instruct and are particularly lacking in air feeling, time and mass factors which must be learned in order to become an efficient pilot.

Therefore, one object of this invention is to provide a simple mechanism includng a fuselage so mounted that it may have all possible movements of a plane flying under favorable or adverse weather conditions together with means whereby a student may impart movements which would normally take place when operating a plane in flight or overcome unexpected movements imparted by other means outside the student's control and return the fuselage to an even keel.

Another object of the invention is to so construct the control means that the student may actuate the same in a normal manner through the medium of a foot bar, for horizontal turns and by means of a hand lever or "stick" such as is ordinarily employed for adjusting ailerons when banking and for adjusting the horizontal stabilizers when zooming or gliding. Therefore, the student may learn to handle the controls and become accustomed to the feel of them before actually making a flight in the air.

Another object of the invention is to provide a device of this character in which the means for imparting movements to the fuselage outside the student's control and representing unnatural movements of a plane due to weather conditions or improper handling may be controlled by a perforated paper strip, thereby permitting instruction strips or sheets to be prepared and selectively used.

Another object of the invention is to permit instruments in the fuselage to be selectively actuated as the instruction sheet moves as well as movement to be imparted to the fuselage. Therefore, the instruments may be actuated to indicate changes in elevation and angle of a plane at the same time movements are imparted to it and a student occupying an enclosed cockpit learns to observe the instruments the same as would be necessary when flying "blind" through fog and correct errors indicated by the instruments.

Figure 3:
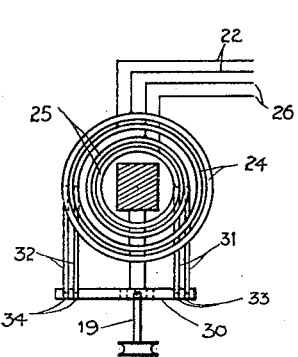
Figure 4:
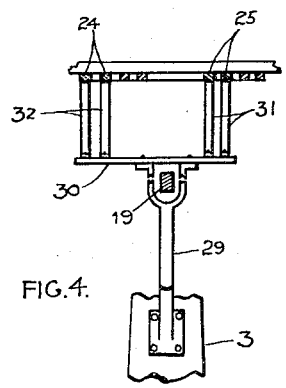
Figure 2:
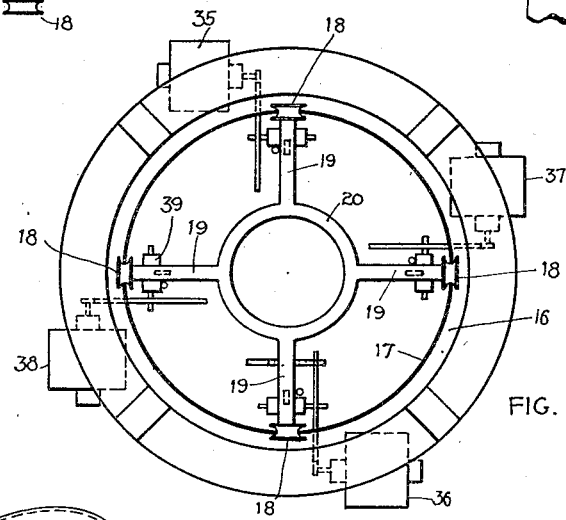
Figure 5:
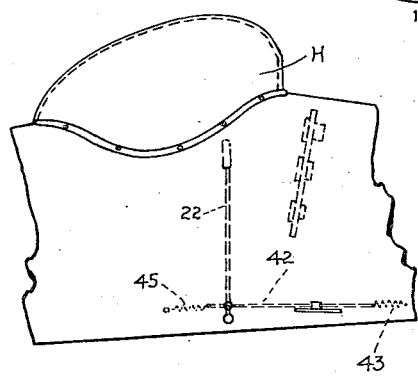
Figure 6:
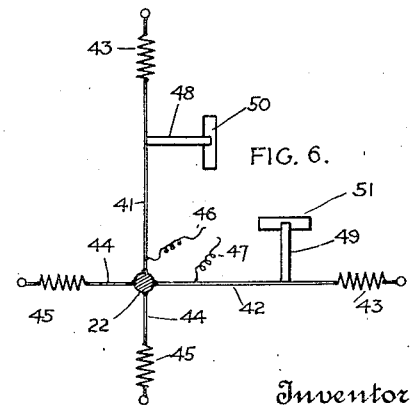
Figure 13:
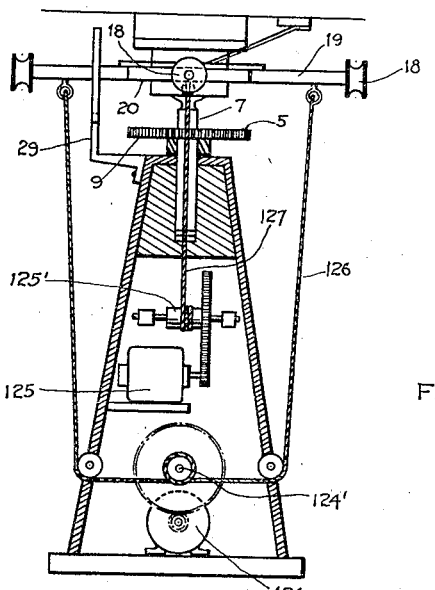
Figure 14:
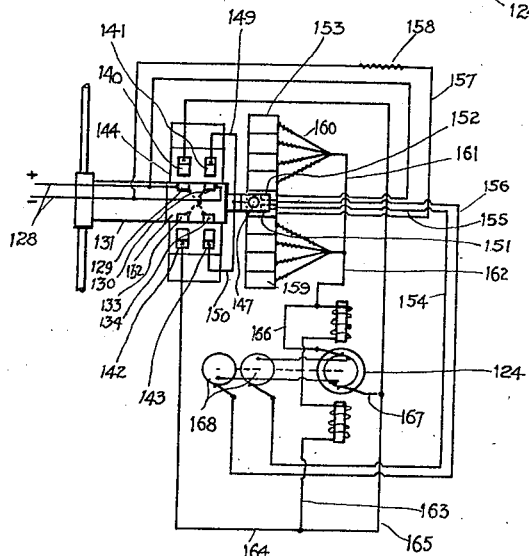
Figure 15:
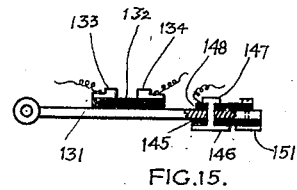
Figure 16:
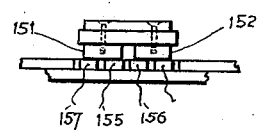
Figure 17:
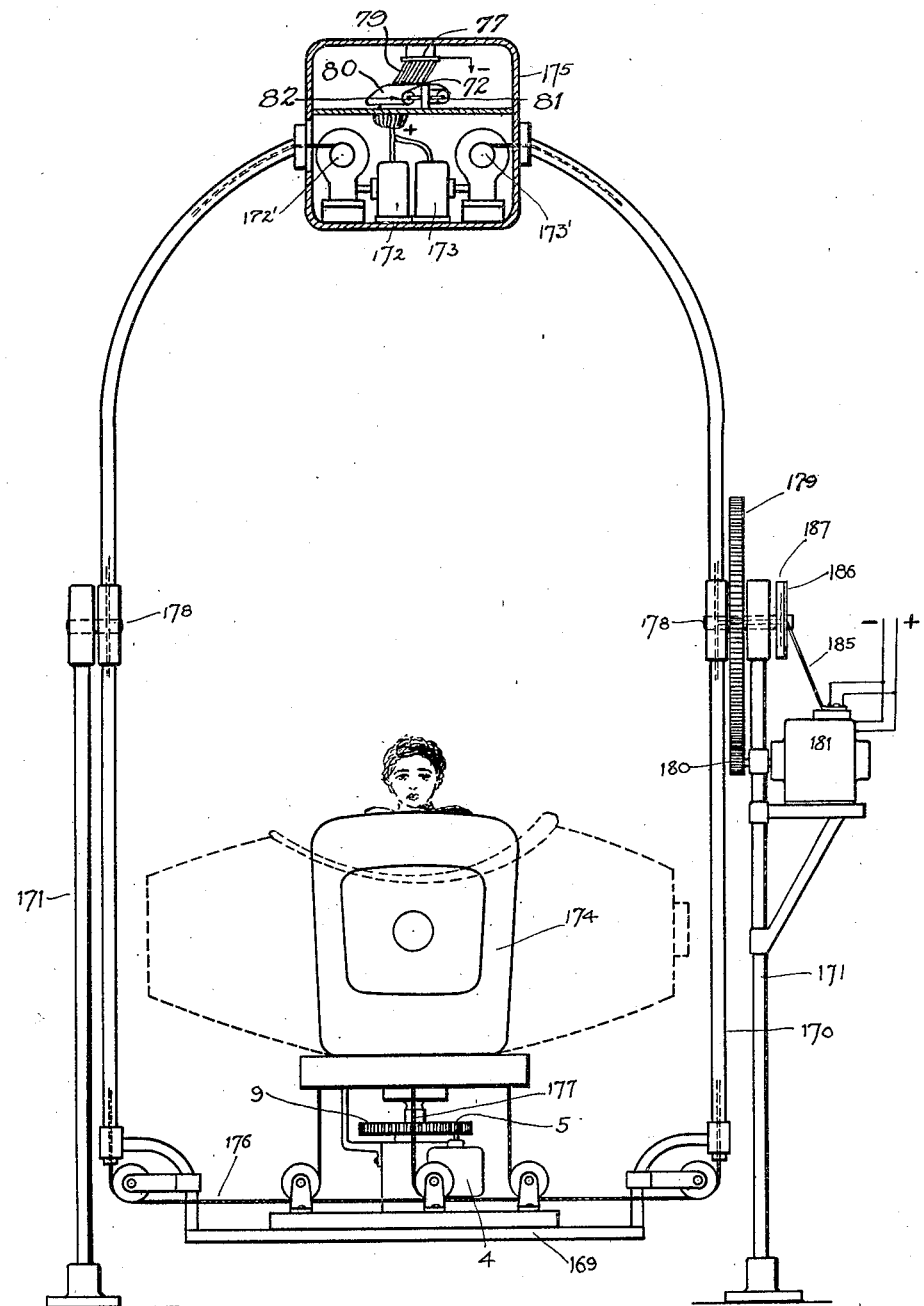

The invention is illustrated in the accompanying drawings, wherein:

Figure 1 is a view showing one embodiment of the invention, partly in elevation and partly in section, Fig. 2 is a sectional view taken on the line 2—2 of Fig. 1 with portions omitted, Fig. 3 is a view showing slip rings and elements associated therewith, Fig. 4 is a side elevation of the structure shown in Fig. 3, Fig. 5 is a fragmentary view of the fuselage, Fig. 6 is a diagrammatic view of the control stick and associated elements, Fig. 7 is a modified form of motor power for operating the fuselage, Fig. 8 is a modified form of the invention, Fig. 9 is a top view of a portion of Fig. 8, Fig. 10 is a top view of a slidable contact member, Fig. 11 is a side elevation of Fig. 10, Fig. 12 is a wiring diagram for the control means, Fig. 13 is another modified form of the invention using two motors instead of four, Fig. 14 is a diagram for the two motor type, Fig. 15 is a view of a contact-forming part of the diagram in Fig. 14, Fig. 16 is a fragmentary view in elevation, and Fig. 17 is a front elevation of a form of the invention allowing loops to be executed.

The apparatus constituting the subject-matter of this invention includes a base or platform 1 which may be level with the floor or supported in an elevated position by legs 2. Upon this platform is mounted a standard or pillar 3 from one side of which extends a shelf to support an electric motor 4, the shaft of which projects upwardly and carries a gear 5. A socket 6 is located in the upper end of the pillar and rotatably receives the lower end of a post 7 and a bearing 8 is provided in the socket so that the post may turn easily. A large gear 9 is fixed about the post and meshes with the small gear 5 and it will be seen that when the motor 4 is energized rotary motion will be imparted to the post.

Above the post is disposed a fuselage 10 and this fuselage carries a socket 11 into which a ball 12 at the upper end of the post 7 is held by a collar 13 threaded upon the socket. Therefore, the fuselage may turn horizontally above the post or be tilted in any direction desired and movements of a plane in flight accurately represented. A latch 14 is carried by the fuselage and engageable in a socket 15 formed in the ball 12 when the latch is turned to dispose the pin 14' for passage downwardly through the slot 10' in the bottom of the fuselage. Therefore, the fuselage may be secured and prevented from tilting when the apparatus is not in use. A circular track 16 is mounted below the fuselage concentric to the socket 11 and this track is formed of angle metal to provide an upstanding flange 17 upon which rest wheels or rollers 18 rotatably carried by arms 19 radiating from a ring 20. The ring together with its arms constitute a frame which encircles the socket 11 in spaced relation thereto and since the wheels 18 rest upon the track the fuselage may be selectively tilted forwardly, rearwardly, or towards either side and caused to assume positions natural to a plane when executing maneuvers in the air.

The controls consist of the usual foot bar 21 by means of which the rudder of an airplane is controlled and a hand lever or "stick" 22 by means of which the stabilizers and ailerons of an airplane are adjusted. Wires 22' lead from insulated contacts 23 upon the rudder bar to a pair of slip rings 24 secured upon the fuselage about the socket and these rings are concentric to a second pair of slip rings 25 from which extend wires 26 leading to contacts 27 and 28 disposed at opposite sides of one end of the foot bar. A bracket 29 secured to the standard 3 extends upwardly therefrom and terminates in forks which straddle one arm of the ring 20 to keep this ring from turning and the forks carry a cross bar 30 upon which are secured brushes 31 and 32 insulated from each other and bearing against the slip rings 24 and 25. Power wires 33 leading from a source of electric energy are attached to the brushes 31 and wires 34 lead from the brushes 32 to the motor 4. It will be readily seen that when the rudder bar is moved in one direction to engage its contacts with the contacts 27 the motor will be rotated in a direction opposite to that in which it rotates when the rudder bar is moved in an opposite direction to engage its contacts with the contacts 28. Therefore, by pressing the rudder bar with the right or left foot the post 7 can be rotated in a desired direction and the fuselage caused to turn either towards the right or left. Friction between the ball and socket will cause the fuselage to gradually turn with the post instead of suddenly turning and a turn very similar to that of a plane in flight will occur.

In order to tilt the fuselage, there have been provided motors 35, 36, 37 and 38. These motors are mounted upon the platform 1 and geared to drums 39 upon which are wound cables 40 which extend upwardly and are secured to the arms 19 of the ring 20. By having the motors normally all equally energized the cables will be equally tensioned and the fuselage held horizontal whereas if the front motor 35 is energized more than the rear motor 36 the fuselage will be tilted forwardly to a position for gliding or steeper if so desired. If the motor 37 at the right is energized more than the left motor 38, the fuselage will be banked for a right turn.

Cables 41 and 42 of conductive material extend from the stick 22 at right angles to each other, as shown in Fig. 6, with the cable 41 extending longitudinally of the fuselage and the cable 42 transversely thereof and these cables are engaged with springs 43 which tension them and yieldably resist movement of the stick away from the springs. Bracing cables 44 having tensioning springs 45 are preferably provided so that the stick will be normally held vertical but they may be omitted or other means provided to yieldably retain the stick vertical. Wires 46 and 47 connect the cables 41 and 42 with the negative power wire and from the cables extend contact arms 48 and 49 which bear against contact blocks 50 and 51. Each block carries center contacts 52 and groups of contacts 53 and 54 insulated from each other. Resistances 55 of high value are connected with the center contacts as shown in Figure 12 and from these resistances extend wires 56 and 57 which lead to the negative sides of the motors. Other wires 58 lead from the positive power wire to the motors 35 and 37 and carry branch wires 59 leading to the motors 36 and 38. By this arrangement current may pass to all the motors when the stick is in a neutral position with the bridges engaging all of the center contacts 52 and the motors will exert equal pull upon the cables 40 and retain the fuselage in a horizontal position. Resistances 59, 60 and 61 of decreasing values lead from the contacts 53 and are connected to a wire 62, the ends of which are secured to terminals 63 and 64 of a carrier 65 slidably mounted upon a base 66 and this carrier also supports terminals 67 and 68 to which are secured wires 69 and 70 leading respectively from the wires 56 and 57. Plates 71 are provided at opposite sides of the arms 48 and 49 in insulated relation thereto and by proper movement of the arms through the medium of the stick any one of the motors may have its energy increased sufficiently to draw upon its cable 40 and draw the fuselage downwardly in a desired direction.

When this device is in use, the latch is released and the student who occupies a seat in the fuselage places his feet against the foot bar and grasps the stick in the usual manner. When steering a plane in flight, it is necessary to tilt it into a bank to prevent skidding while turning and this is done by moving the stick transversely of the fuselage in the direction in which the turn is to be made to adjust the ailerons while the vertical rudder is moved through pressure upon the foot bar. The horizontal stabilizers or "flippers" are adjusted for a glide by thrusting the stick forwardly and by drawing the stick rearwardly the plane is caused to zoom. In view of the fact that this device is equipped with a rudder bar upon which the student presses with his feet and a stick capable of being moved forwardly, rearwardly and to the right or left, the motions necessary when steering a plane or adjusting the ailerons to keep it upon an even keel and prevent side slipping may be accurately performed. Movement of the foot bar by pressure with one foot establishes engagement of the contacts 23 with the contacts 27 while movement with the other foot shifts the contacts 23 into position to engage the contacts 28. In one position the motor rotates the gear 9 and post 7 towards the right whereas in the other position the flow of current through the motor is reversed and the post rotates towards the left. Frictional engagement between the ball 12 and socket 11 causes the fuselage to turn with the post but a certain amount of slippage takes place and, therefore, the turns will be smooth and gradual instead of abrupt and a very good representation of a turn made by a plane in flight will take place. At the same time the foot bar is pressed upon the stick is moved upwards to the right or left according to the direction in which a turn is to be made and the cable will be shifted longitudinally by pull of the stick or contraction of its spring 43 according to the direction in which the stick is moved. Normally the bars or arms 48 and 49 are centered with respect to the contact blocks and each engages the center contacts 52 without touching the terminals of the carriers 65 and all the motors 35, 36, 37 and 38 are equally energized sufficiently to tension their cables and prevent tilting of the fuselage but when the stick is moved towards the right the arm moves towards one end of the block from one contact 53 to another while at the same time contact is established between the terminals 63 and 67. Therefore, the circuit for the motor 38 will be broken and the power of the motor 37 increased as the current passes by way of the wire 62, terminals 63 and 67 and wire 69 to the wire 56 leading to the motor 37 and through its wire 58 to the positive power wire. When so energized, the drum of the motor 37 will be rotated to wind up its cable 40 and draw the right side of the fuselage downwardly to a banked position. Movement of the stick towards the left to return the plane to an even keel shifts the arm 49 into engagement with the terminals 64 and 68 and a circuit is established through the wires 66 and 70 to the wire 57 through which the current will pass to the motor 38 and through the branch wire 59 and wire 58 to the positive power wire. Therefore, the circuit for the motor 37 will be broken and the drum of the motor 38 rotated to wind up its cable and draw the fuselage downwardly at the left until it is returned to a horizontal position. As the fuselage returns to a horizontal position, the stick will be shifted to the upright or neutral position and both motors 37 and 38 equally energized so that equal pull is exerted upon their cables and the fuselage retained in a horizontal position.

The reverse operation takes place when the plane is banked for a left turn and glides or zooms are performed in a like manner except that when gliding or zooming the front and rear motors 35 and 36 are actuated instead of the motors 37 and 38. When a spiral is to be executed, it is necessary to nose the plane over as well as bank it and in order to execute this maneuver, it is necessary to move the stick forwardly in a diagonal direction thereby allowing the arms 48 and 49 to be both moved and the forward motor and one side motor energized to tilt the plane into a spiraling position and the rear motor and other side motor then energized to bring it out of the spiral. Of course, the rudder bar must be actuated to energize the motor 4 and swing the fuselage while spiraling.

As previously stated, the student is also to be taught to counteract unexpected and adverse movements of a plane which often take place in actual flight during bad weather or as the result of carelessness or inexperience. This may be a side slip, tail spin or other movements. In order to impart these movements to the fuselage, there has been provided energizing means for the motors 35, 36, 37 and 38 not subject to control of the occupant of the fuselage but its effect upon the fuselage can be counteracted by proper movements of the stick.

This means includes a track bar 72 carrying contacts 72' insulated from each other and exposed at the upper edge face of the bar. Wires 73 and 74 lead from certain of the contacts 72 to the wires 56 and 57 of the circuits for the motors 35 and 36 and similar wires 75 and 76 lead from another pair of contacts 72' to the circuit wires 56 and 57 of the motors 37 and 38. A buss bar 77 which is connected with the negative power wire by a wire 78 extends longitudinally above the track bar and carries resilient contact strips 79 disposed to bear against the upper ends of the contacts 72'. An elongated sheet or strip 80 of insulating material normally rolled upon a spool 81 and adapted to be wound upon another spool 82 extends across the track bar and is cut to provide openings 83 located to expose selected contacts 72 and allow companion contacts 79 to engage the same when they are exposed. Therefore, the front, rear and side motors can be energized by means beyond control of the pilot while the contacts 72' are exposed and unexpected movements imparted to the plane which the student must learn to overcome by proper movements of the stick. Strips, each cut different from the others, will be selectively used and by this means practically all weather conditions liable to be encountered when actually flying and their effect upon a plane may be simulated and the student taught to fly under adverse conditions as well as favorable.

It is also an object of the invention to teach a student to fly "blind" and in order to do so dummy instruments 84 such as are ordinarily used are provided upon the instrument board in the fuselage. One of these instruments is shown in the diagram and includes a pointer 85 engaged by the core 86 of a solenoid 87. The solenoid winding has one end connected with the positive power wire by a wire 88 and from its other end extends a wire 89 attached to the terminal 90 of the track bar. A branch wire 91 leads from the wire 89 to a contact 92 and in this wire is disposed a resistance 93. As the strip 80 passes over the track and the contacts 90 and 92 are exposed, current passes through the solenoid and gradually causes the pointer to be moved over its scale thereby indicating operation of the instrument. By providing a suitable number of instruments various movements of the plane can be indicated and by providing the fuselage with a hood H so that the cockpit can be enclosed the student can be taught to watch the instruments and learn to control a plane flying through fog which prevents observation of country over which the plane is passing.

In Figure 7, there has been shown a modified construction. In this form of the invention, there has been shown a solenoid 94, one of which will be used in place of each of the motors 35, 36, 37 and 38. A dash pot 95 having a regulating valve 96 extends from the lower end of the solenoid and the core or armature 97 extends upwardly and is connected by a universal joint 98 to an arm 99. The upper end of this arm rotatably supports a roller 100 which rests upon the rail of the fuselage. The operation when this form of the invention is used is the same as previously described except that the solenoids are energized instead of motors and the arms 99 drawn downwardly to tilt the fuselage instead of having cables wound upon drums. By setting the valve the instructor can control speed at which the core moves.

In Figures 8 and 9 another form is disclosed. In this construction, there is provided a rotary shaft 101 extending horizontally and rotated by a motor 102 or in any other desired manner. A counter-shaft 103 is rotatably mounted at one side of the main shaft parallel thereto and driven therefrom and upon these shafts are loosely mounted drums 104 and 105, corresponding to the drums of the motors 35, 36, 37 and 38, and carrying cables 108 which extend upwardly for engagement with the arms 19 so that the fuselage may be tilted when the cables are drawn upon. Each cable is wrapped about its drum and has an end portion extending downwardly and secured to a plunger 109 slidably passed through a dash pot 110 and having a head 109' at its lower end against which bears a spring 111. Therefore, the cables will be held under tension and the fuselage normally retained in a horizontal position. Clutch elements are provided at one end of each drum and upon the shafts are keyed clutches 112 and 113 engaged by forks 116 and 117 yieldably held in position to retain the clutches out of engagement with their companion drums but adapted to be drawn towards the drums by electro-magnets 120 and 121 which take the place of the motors 35, 36, 37 and 38 and are to be selectively energized by manipulation of the stick as previously set forth. The shaft 101 may be any length desired and a number of fuselages may be mounted above it and each operated independently of the others. Therefore, a number of students may be instructed at the same time and the devices all driven from the same power shaft.

It is also possible to operate the fuselage by a pair of motors instead of four. This embodiment of the invention is illustrated in Figure 13 and referring to the same it will be seen that the motors 124 and 125 are mounted upon supports in the base at right angles to to each other and are adapted to rotate drums 124' and 125' upon which are wound cables 126 and 127, the ends of which are led upwardly and secured to the arms 19 of the ring 20. As the drums are rotated, the cables engaged therewith will each have one end drawn upon and its other end let out and, therefore, the fuselage may be tilted longitudinally or transversely. The motors are reversible and, therefore, the fuselage may be tilted in a selected direction and returned to a horizontal position.

Referring to the diagram of Figure 14 wherein one motor is shown, it will be seen that the power wires 128 are secured to terminals 129 and 130 carried by the metal arm 131 and insulated therefrom by a block of insulation 132 upon which are also mounted terminals 133 and 134 having connection with the terminals 129 and 130 by wires 135 and 136. The arm is anchored to the rod 137 slidably carried by a bracket 138 for movement when the cable 139 leading to the stick is moved longitudinally and terminals 140, 141, 142 and 143 are mounted upon a sliding block of insulation 144 for engagement by the terminals of the arm when the arm is moved. Near the free end of the arm is secured a block of insulation 145 having a contact plate 146 secured against the same by a screw 147 insulated, as shown at 148, and to this screw are attached wires 149 and 150 leading to the terminals 141 and 143, respectively. Contact plates 151 and 152 are also secured against the insulation to bridge the current over at the neutral portion of the contact block 153 carrying insulated plates from which extend wires 154, 155, 156 and 157. The wires 154 and 157 lead to the power wires 128 and in the wire 157 is located a resistance 158. Graded resistances 159 and 160 lead from contact plates of the contact block which are joined by a bridging wire 161 and these resistances are connected with a wire 162 leading to the fields of the motor. From the other side of the motor extends a wire 163 having branches 164 and 165 leading to the contacts 140 and 142 and wires 166 and 167 lead from the wires 162 and 163 to the brushes of the motor. The wires 155 and 156 are attached to brushes bearing against slip rings 168 disposed about armature of the motor and electrically connected with the commutator. By this arrangement the motor will be polarized. It will be understood that each motor will be similarly wired and that when the stick is moved the operation which takes place will be the same as in the first form of the invention described.

In Figure 17, there has been disclosed an embodiment of the invention allowing loops to be executed as well as movements previously described. In this form the platform carrying the pillar or standard is mounted upon the end bar 169 of a frame 170 which has its side bars pivoted to standards 171. Motors 172 and 173 for tilting the fuselage 174 forwardly and rearwardly and towards the right and left are mounted in a casing 175 at the opposite end of the frame and constitute a counterweight which causes the frame to swing easily. These motors have the cables 176 and 177 wound upon their drums 172' and 173' and lead through the tubes from which the frame is formed and engaged with guide pulleys after which they are extended upwardly and secured so that the fuselage may be tilted as heretofore described. Upon one of the shafts 178 which mount the frame 170 for swinging movement is fixed a large gear 179 which meshes with a small gear 180 upon the shaft of the motor 181 and this motor has wires 182 and 183 leading, respectively, to a contact 184 and the positive power wire, as shown in the diagram of Figure 12. Therefore, when the stick is drawn far back to the position naturally assumed when looping, the motor 181 will be energized and the frame swung about its axis which causes the fuselage to describe a true loop. Brushes 185 extend from the motor 181 and bear against slip rings 186 carried by an insulating disk 187 upon the shaft 178 and wires lead from the slip rings through the tubes of the frame to the motors and to switches in the fuselage.

Having thus described the invention, I claim:

1. An instructing device comprising a body mounted for turning and universal tilting movement, an annular track beneath said body rigid therewith, a frame surrounded by said track and having supports resting upon the track, means connected with said frame in spaced relation circumferentially thereof to tilt the body and return the same to a horizontal position, means for selectively energizing said tilting means, and means to effect turning of the body in a horizontal path.

2. An instructing device comprising a body mounted for turning and universal tilting movement, an annular track beneath said body rigid therewith, a frame surrounded by said track and having supports resting upon the track, drums beneath said body, cables wound upon said drums and secured to said frame in spaced relation to each other circumferentially thereof, means for selectively rotating said drums to tilt the body and return it to a horizontal position, and means for turning the body.

3. An instructing device comprising a body mounted for turning and universal tilting movement, an annular track beneath said body rigid therewith, a frame surrounded by said track and having supports resting upon the track, drums rotatably mounted, cables wound upon said drums and secured to said frame, means for selectively rotating said drums to draw upon the cables and tilt the body, and means for turning the body.

4. An instructing device comprising a post rotatably mounted, a body, a ball and socket connection between said post and body, and means for rotating said post, friction between the members of the ball and socket causing the body to gradually turn with the post.

5. An instructing device comprising a post rotatably mounted and having a ball at its upper end, a body supported upon said post and having a socket receiving the ball, and means for rotating said post, friction between the ball and socket causing the body to gradually turn when the post is rotated.

6. An instructing device comprising a post rotatably mounted, a body supported upon said post and adapted to have universal tilting movement relative to the post, means for controlling tilting of the body, and means for rotating the post to swing the body horizontally.

7. An instructing device comprising a post rotatably mounted, a body supported upon said post and adapted to have universal tilting movement relative to the post and having frictional engagement with the post to cause gradual turning of the body with the post when the post is rotated, a latch for releasably securing the body against tilting, means for controlling tilting of the body when released, and means to rotate the post.

8. An instructing device comprising a post rotatably mounted, a body supported upon said post and adapted to have universal tilting movement relative to the post, means for controlling tilting of the body, a gear fixed about said post, a motor having a gear upon its shaft meshing with the gear of the post; and a circuit for said motor including a two-way switch and a foot bar for operating the same.

9. An instructing device comprising a standard, a post rotatably carried by said standard and extending upwardly therefrom and terminating in a spherical head, a body above said post having a seat, a socket secured beneath said body and receiving the spherical head to mount the body for turning and universal tilting movements, a circular track secured beneath the body about the socket, a floating ring surrounding said socket and having radiating arms carrying rollers resting upon said track, means for rotating said post, frictional engagement between the socket and head of the post causing the body to gradually turn with the post, means connected with said arms for drawing downwardly thereon, and means for selectively actuating the last-mentioned means whereby the body may be tilted in a desired direction and returned to a horizontal position.

10. An instructing device comprising a standard, a post rotatably carried by said standard and extending upwardly therefrom and terminating in a spherical head, a body above said post having a seat, a socket secured beneath said body and receiving the spherical head to mount the body for turning and universal tilting movements, a circular track secured beneath the body about the socket, a floating ring surrounding said socket and having radiating arms carrying rollers resting upon said track, means for rotating said post, frictional engagement between the socket and head of the post causing the body to gradually turn with the post, drums, cables wound upon said drums and extending upwardly therefrom and engaged with said arms, and means for selectively rotating said drums to draw upon the cables whereby the body may be tilted in a desired direction and returned to a horizontal position.

11. An instructing device comprising a standard, a post rotatably carried by said standard and extending upwardly therefrom and terminating in a spherical head, a body above said post having a seat, a socket secured beneath said body and receiving the spherical head to mount the body for turning and universal tilting movements, a circular track secured beneath the body about the socket, a floating ring surrounding said socket and having radiating arms carrying rollers resting upon said track, means for rotating said post, frictional engagement between the socket and head of the post causing the body to gradually turn with the post, drums, cables wound upon said drums and having end portions extending from opposite sides thereof and engaged with said arms, motors for rotating said drums and winding the cables to tilt the body in a desired direction, and means for selectively energizing the motors and reversing the same.

12. A instructing device comprising a standard, a post rotatably carried by said standard and extending upwardly therefrom and terminating in a spherical head, a body above said post having a seat, a socket secured beneath said body and receiving the spherical head to mount the body for turning and universal tilting movements, a circular track secured beneath the body about the socket, a floating ring surrounding said socket and having radiating arms carrying rollers resting upon said track, means for rotating said post, frictional engagement between the socket and head of the post causing the body to gradually turn with the post, drums, cables wound upon said drums and extending upwardly therefrom and engaged with said arms, motors geared to said drums whereby the drums may be rotated to draw upon the cables and tilt the body, and means for selectively opening and closing circuits through the motors.

13. An instructing device comprising a standard, a post rotatably carried by said standard and extending upwardly therefrom and terminating in a spherical head, a body above said post having a seat, a socket secured beneath said body and receiving the spherical head to mount the body for turning and universal tilting movements, a circular track secured beneath the body about the socket, a floating ring surrounding said socket and having radiating arms carrying rollers resting upon said track, means for rotating said post, frictional engagement between the socket and head of the post causing the body to gradually turn with the post, a rotary shaft extending below said body, drums, cables wound upon said drums and secured to said arms, electrically actuated means for individually locking the drums to turn with the shaft and cause the body to be tilted in a desired direction, and means for selectively opening and closing circuits through the said electrically actuated means.

14. An instructing device comprising a standard, a post rotatably carried by said standard and extending upwardly therefrom and terminating in a spherical head, a body above said post having a seat, a socket secured beneath said body and receiving the spherical head to mount the body for turning and universal tilting movements, a circular track secured beneath the body about the socket, a floating ring surrounding said socket and having radiating arms carrying rollers resting upon said track, means for rotating said post, frictional engagement between the socket and head of the post causing the body to gradually turn with the post, drums, cables wound upon said drums and extending upwardly therefrom and engaged with said arms, motors geared to said drums whereby the drums may be rotated to draw upon the cables and tilt the body, circuits for said motors, and control means for said circuits including a stick pivotally mounted in said body and yieldably held in a vertical position, a cable extending radially from said stick, the motors being arranged in pairs, a bridging element connected with said cable and moved transversely when the cable is moved by the stick, contacts at opposite sides of the bridge mounted upon a support movable by the bridge, graduated resistances including signal lights bridged to each other and having wires leading therefrom to certain of the contacts at opposite sides of the bridge, wires leading from a neutral point between the resistances to individual motors and having branches leading to the other contacts at opposite sides of the bridge, means for changing the poles of the motors, and means for neutralizing armatures of the motors when the bridging element is in a neutral position.

15. An instructing device comprising a frame mounted to swing about a horizontal axis intermediate its length, a support at one end of said frame, a body carried by said support and moving with the frame in a vertical orbit about the axis of the frame, the frame being of sufficient length to dispose an occupant of the body in spaced relation to the axis of the frame, and means for controlling movement of the frame.

16. An instructing device comprising a frame mounted to swing about an axis intermediate its length, a support at one end of said frame, a body carried by said support and moving with the frame in an orbit about the axis of the frame, said body being mounted upon its support for universal tilting and turning about the same, means for turning the body upon its support, a motor casing at the other end of said frame, motors in said casing, drums rotated from said motors, cables for controlling tilting of said body extending along said frame into said casing and wound upon said drums, means for swinging the frame about its axis, and controlling means for the motors.

17. An instructing device of the character described comprising a body, means mounting said body for universal movement, electric energizers for imparting movement to said body, circuits for said energizers, means for closing circuits for selected energizers operable by an occupant of the body, and automatic circuit closing means beyond control of an occupant of the body.

18. An instructing device of the character described comprising a body, means mounting said body for universal movement, electric energizers for imparting movement to said body, circuits for said energizers, means for closing circuits for selected energizers operable by an occupant of the body, and automatic circuit closing means beyond control of an occupant of the body including stationary contacts insulated from each other, movable contacts to bear against the stationary contacts, and insulation movable between the stationary and movable contacts and adapted to expose selected stationary contacts as it moves.

19. An instructing device of the character described comprising a body, means mounting said body for universal movement, electric energizers for imparting movement to said body, circuits for said energizers, means for closing circuits for selected energizers operable by an occupant of the body, and automatic circuit closing means beyond control of an occupant of the body including a tracker bar, stationary contacts carried thereby, contacts movable towards and away from the tracker bar and adapted to bear against companion stationary contacts, and a strip of insulating material movable across the tracker bar and formed with openings to expose certain of the stationary contacts as it moves.

20. An instructing device of the character described comprising a body, means mounting said body for universal movement, electric energizers for imparting movement to said body, circuits for said energizers, means for closing circuits for selected energizers operable by an occupant of the body, and automatic circuit closing means beyond control of an occupant of the body including stationary contacts insulated from each other, movable contacts to bear against the stationary contacts, insulation movable between the stationary and movabe contacts and adapted to expose selected stationary contacts as it moves, an instrument in the body for indicating movement of the plane, and a circuit for said instrument including a contact for engagement by one of the movable contacts.

In testimony whereof he affixes his signature.

JOHN P. BUCKLEY.